(No Model.)
O. O. OZIAS.
PRICE SCALE.
No. 527,125.  Patented Oct. 9, 1894.
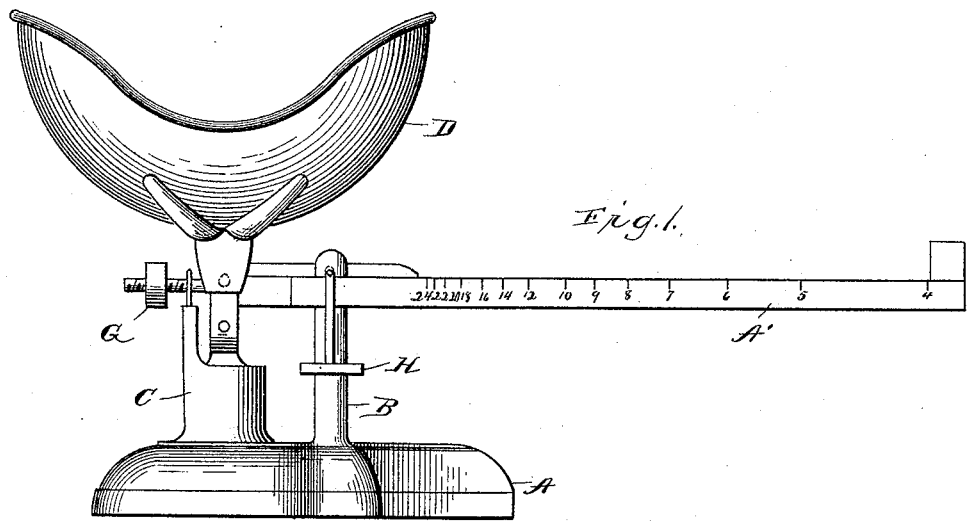
Fig. 1.
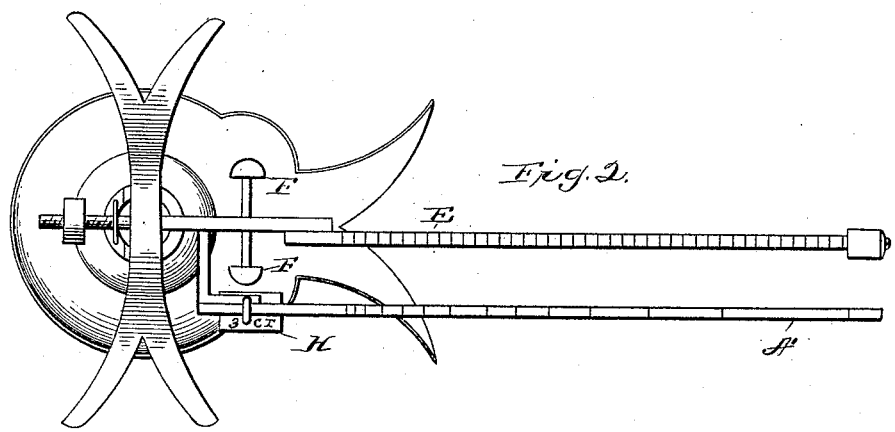
Fig. 2.
Fig. 3.
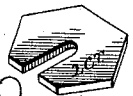

UNITED STATES PATENT OFFICE.

ORANGE O. OZIAS, OF DAYTON, OHIO.

PRICE-SCALE.

SPECIFICATION forming part of Letters Patent No. 527,125, dated October 9, 1894.

Application filed January 19, 1894. Serial No. 497,434. (No model.)

*To all whom it may concern:*

Be it known that I, ORANGE O. OZIAS, of Dayton, in the county of Montgomery and State of Ohio, have invented certain new and useful Improvements in Price-Scales; and I do hereby declare the following to be a full, clear, and exact description of the same, reference being had to the accompanying drawings, forming a part of this specification, and to the letters of reference marked thereon.

This invention relates to improvements in that class of scales known as price scales and has for its object to provide an extremely simple structure if desired, capable of use similar to an ordinary grocer's counter scales but adapted to weigh goods at any price per unit within the capacity of the beam and of any total cost within the capacity of the poise weights, thus adapting it especially for use when the rate per unit does not vary between very wide limits although the quantity at any rate may be very large or small, as for instance in weighing baggage or express matter where at certain given rates the total charge for small and light goods or large and heavy goods may have to be determined.

Primarily, the invention consists in scales having a beam pivoted in fixed bearings, graduated to indicate rates per unit and put in balance without the counter poise, which latter may be entirely removed or its weight neutralized, as by being hung at the fulcrum of the beam.

Further, the invention consists in scales having a beam pivoted in fixed bearings with differential graduations thereon, i. e., assuming that the graduations indicate uniform rises in the scale of values as 4, 5, 6, 7, 8, &c., the distance between the graduations near the fulcrum of the beam is less than those more remote from the fulcrum, whereby a counterpoise of a certain weight will have the same valuation in any position of adjustment on the beam.

Finally, the invention consists in certain novel details of construction and combinations and arrangements of parts all as will be now described and pointed out particularly in the appended claims.

Referring to the accompanying drawings: Figure 1 is a side elevation of a scale constructed in accordance with my present invention. Fig. 2 is a top plan view of the same. Fig. 3 represents a few of the supplemental cost weights for small amounts.

Like letters of reference in the several figures indicate the same parts.

As the most convenient means for illustrating my present invention, I have shown in the drawings a form of simple grocer's or counter scales, having a base or foot A, fulcrum standard B, scale standard C, and a movable scoop D all of usual construction.

The beam E, also of usual construction, is pivoted on knife edge bearings F and the shorter arm carries the scoop support through the usual intermediate knife edge bearings.

A tare weight G may be screwed on the rear end of the beam, if desired.

The beam E may be graduated in accordance with my invention to indicate unit prices, but I prefer to have it simply graduated in the ordinary manner to indicate pounds, ounces, &c., adapting the scales for ordinary use without confusion, and in addition to the beam E, I prefer to employ a supplemental beam A' parallel and secured rigidly thereto, thus in effect forming a double beam, the said supplemental beam A' being graduated in accordance with my present invention as will presently appear.

The supplemental beam A' is usually arranged in front of the fulcrum (see Fig. 2) in order that the counter poise H may be hung opposite said fulcrum and exert no influence on the beam tending to throw the scale out of balance, it being a very essential feature that the scale should be in balance with the counter-poise entirely removed or its effect neutralized.

The counterpoise employed, is given a fixed valuation, usually small so as to not be above the cost of any goods which the scale is adapted to handle. In the illustration three cents is given as the valuation indicated by the counterpoise, and additional or supplemental weights each of a fixed valuation are added to give the proper range of cost price. Of course the number of such weights employed is practically unlimited, although I have in Fig. 3 illustrated but four, ranging from one to four cents.

In the illustration shown, the range of rate valuation indicated on the beam is from four cents per unit (pound) to twenty four cents per unit (pound), and the rates above twelve cents are only even numbers. It will be particularly noted that these rate per unit indications are not spaced uniformly, but those near the fulcrum are closer together than those more remote therefrom, the proportion of the increased distance between them being easily ascertained by experiment with standard weights or by mathematical computation. For instance, as shown, the 24 cent unit mark is approximately the same distance from the fulcrum on one side as is the knife edge bearing for the scoop on the opposite side. The 12 cent indication is just twice as far from the fulcrum; and the 6 cent mark twice as far as the 12 cent mark. The principle applies to all the indications and their multiples or divisor.

Obviously, the beam may be graduated for rate units between any two numbers within the capacity of the beam, depending on the use for which the scale is intended; for instance, if for selling expensive substances, the lowest rate on the beam is fixed at the lowest rate at which the substance is sold, say ninety cents or a dollar and the higher indications are proportionately increased in value. Therefore by changing the rate valuations indicated on the beam and varying the number of counterpoise weights, scales adapted for any use may be made, and in addition to the computing or price feature, the scales may be made to operate as an ordinary balance scale, without complicating the mechanism in the least.

The scales are especially adapted for grocers' use where the rates per unit often runs into the fractions making it difficult to determine the quantity to give for a certain sum, or the cost of a portion of given weight or bulk, and also for use on scales for weighing baggage, &c., on railroads. In this instance in fact, the scales if made for a certain station may have the names of places stamped on the beam opposite the rate mark indicating the rate to that place; for instance if the unit were one hundred pounds and the rate from the starting point to Baltimore were 10 cents per unit, the word Baltimore might be stamped opposite the 10 cent per unit mark, together with names of other places to which the same rate applied, and in determining the amount of the freight, the poise is hung at the desired mark and extra weights added until, the scales balanced, the sum of the values indicated by the weights being the amount of the freight.

In weighing ordinary goods, groceries for instance, if a customer wants a lump of soda for instance, selling at four cents per unit, the counter poise is placed at the 4 cent mark and weights added until the scale balances when the combined value of the weights indicate the cost, the operations being the same in both instances, but should the customer want fifty cents worth of sugar, and sugar was selling at six cents per pound, the counterpoise would be hung at 6 and weights of a combined value of fifty cents added. Then when sugar is placed in the scoop till a balance is reached it will be exactly the desired amount.

Having thus described my invention, what I claim as new is—

1. A price scales consisting of the goods or substance supporting mechanism, a beam mounted in fixed bearings in balance with said mechanism without the counterpoise, said beam having graduations indicating unit prices, the distance between the graduations indicating regular rises in value increasing from the inner to the outer end of the beam, a counterpoise and supplemental counterpoise weights indicating uniform cost prices at any rate on the beam; substantially as described.

2. In a price scales, the combination with the goods or substance supporting mechanism, of the beam having graduations thereon indicating unit prices, the distance between the graduations, indicating regular rises in value, increasing from the inner to the outer end of the beam, and a counterpoise; substantially as described.

3. In a price scales, the combination with the goods or substance supporting mechanism, of the differentially graduated beam and counterpoise weights marked and indicating cost prices at any rate on the beam; substantially as described.

4. In a price scales, the combination with the goods or substance supporting mechanism, of the differentially graduated beam pivoted in fixed bearings indicating unit prices, a counterpoise weight indicating a cost price at any unit rate, and supplemental counter weights each indicating a fixed cost price at any rate per unit; substantially as described.

ORANGE O. OZIAS.

Witnesses:
 ALEX J. STEWART,
 THOMAS DURANT.